US009372716B1

(12) United States Patent
Ramani et al.

(10) Patent No.: US 9,372,716 B1
(45) Date of Patent: Jun. 21, 2016

(54) DOWNLOAD PRIORITIZATION

(71) Applicant: Amazon Technologies, Inc., Reno, NV (US)

(72) Inventors: Ishwar VenkataManikanda Ramani, San Jose, CA (US); Ansuman Tapan Satpathy, Santa Clara, CA (US); Robert Lewis Bolton, San Francisco, CA (US); Mridula Karumuru, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 14/137,162

(22) Filed: Dec. 20, 2013

Related U.S. Application Data

(60) Provisional application No. 61/881,303, filed on Sep. 23, 2013.

(51) Int. Cl.
G06F 9/46 (2006.01)
G06F 9/48 (2006.01)
G06F 9/445 (2006.01)

(52) U.S. Cl.
CPC .. G06F 9/46 (2013.01); G06F 8/60 (2013.01); G06F 9/4881 (2013.01)

(58) Field of Classification Search
CPC ............ G06F 9/46; G06F 9/4881; G06F 8/60
See application file for complete search history.

(56) References Cited

U.S. PATENT DOCUMENTS

| | | | | |
|---|---|---|---|---|
| 5,448,731 | A * | 9/1995 | Wang | G06F 9/4881 718/103 |
| 6,745,224 | B1 * | 6/2004 | D'Souza | G06F 9/485 707/999.003 |
| 6,769,019 | B2 * | 7/2004 | Ferguson | 709/219 |
| 7,225,264 | B2 * | 5/2007 | Croman | G06F 21/10 348/E5.008 |
| 8,099,482 | B2 * | 1/2012 | Clark et al. | 709/223 |
| 8,320,952 | B2 * | 11/2012 | Chaudhri et al. | 455/522 |
| 8,966,001 | B2 * | 2/2015 | Rauber | G06Q 30/02 709/212 |
| 2002/0154605 | A1 * | 10/2002 | Preston | G06F 9/46 370/254 |
| 2005/0033728 | A1 * | 2/2005 | James | G06F 8/60 |
| 2005/0203851 | A1 * | 9/2005 | King | G06F 17/30067 705/51 |
| 2006/0074750 | A1 * | 4/2006 | Clark et al. | 705/14 |
| 2006/0206587 | A1 * | 9/2006 | Fabbrocino | H04L 63/10 709/219 |
| 2007/0021110 | A1 * | 1/2007 | Chaudhri et al. | 455/418 |
| 2008/0313639 | A1 * | 12/2008 | Kumar | G06F 9/4881 718/104 |
| 2009/0164607 | A1 * | 6/2009 | Clark et al. | 709/219 |
| 2009/0300642 | A1 * | 12/2009 | Thaler | G06F 9/4881 718/105 |
| 2010/0023974 | A1 * | 1/2010 | Shiragaki et al. | 725/58 |
| 2010/0057563 | A1 * | 3/2010 | Rauber et al. | 705/14.53 |

(Continued)

OTHER PUBLICATIONS

Wu & Tzi-Cker, Peer to peer file download and streaming, [Online] 2005, RPE report, TR-185 [Retrieved from the Internet] <http://www.ecsl.cs.sunysb.edu/tr/TR186_RPE.pdf> 32 pages.*

(Continued)

*Primary Examiner* — Thuy Dao
*Assistant Examiner* — Ravi K Sinha
(74) *Attorney, Agent, or Firm* — Shiv S. Naimpally; Lee & Hayes, PLLC

(57) ABSTRACT

In some examples, an electronic device includes a download manager that is configured to determine an order in which to download elements of a file based at least in part on: (i) element priorities of the respective elements of the files, and (ii) application priorities of the respective applications requesting the files.

20 Claims, 5 Drawing Sheets

(56) References Cited

U.S. PATENT DOCUMENTS

| | | | |
|---|---|---|---|
| 2010/0180044 A1* | 7/2010 | Olsson et al. | 709/231 |
| 2011/0022682 A1* | 1/2011 | Zanger et al. | 709/219 |
| 2013/0074087 A1* | 3/2013 | Chambliss | G06F 9/4881 718/103 |
| 2013/0091505 A1* | 4/2013 | Yu | G06F 9/46 718/103 |
| 2014/0013331 A1* | 1/2014 | Noro | G06F 9/4881 718/103 |
| 2014/0164520 A1* | 6/2014 | Fan | G06F 8/60 709/204 |
| 2014/0245313 A1* | 8/2014 | Otenko | G06F 9/46 718/103 |
| 2015/0178133 A1* | 6/2015 | Phelan | G06F 9/4881 718/103 |

OTHER PUBLICATIONS

Xu and Figueiredo, GatorShare: a file system framework for high-throughput data management, [Online] 2010, in Proceedings of the 19th ACM International Symposium on High Performance Distributed Computing (HPDC '10). ACM, New York, NY, USA, [Retrieved from the Internet] <http://dx.doi.org/10.1145/1851476.1851588> pp. 776-786.*

Wang et al., Optimal control for epidemic routing of two files with different priorities in Delay Tolerant Networks, [Online] Jul. 2015, in American Control Conference (ACC), [Retrieved from the internet] <http://ieeexplore.ieee.org/stamp/stamp.jsp?tp=&arnumber=6178493&isnumber=6178422> pp. 1387-1392.*

* cited by examiner

DOWNLOAD PRIORITIZATION

RELATED APPLICATION

This application claims priority to U.S. Provisional Patent Application 61/881,303, filed on Sep. 23, 2013 and entitled "Download Prioritization", which is incorporated herein by reference in its entirety.

BACKGROUND

The use of electronic devices in everyday life continues to increase, as does the number of tasks completed using these devices. For instances, users are spending more and more time on mobile electronic devices, such as mobile phones, tablet computing devices, laptop computers, and the like. As users spend more and more time on these devices, the devices are executing more and more applications, with these applications often downloading content at the request of corresponding users. While the proliferation of the use of these applications is advantageous to users, the applications executing simultaneously on a device often compete for resources of the device, thus slowing down all processes executing on the device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
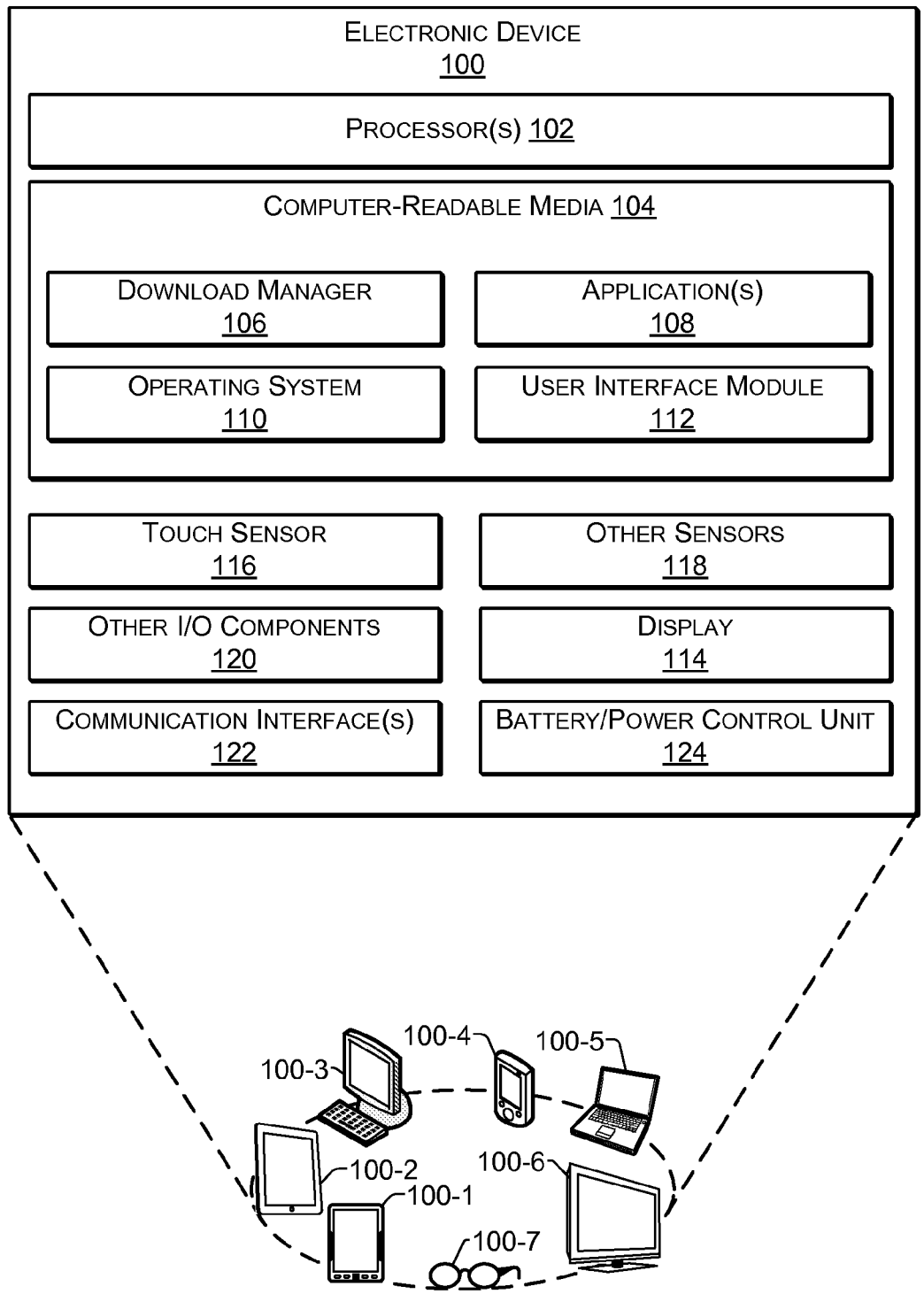
FIG. 1 illustrates components of an example electronic device able to prioritize the obtaining of different files according to some implementations.

This disclosure includes techniques for prioritizing the acquisition of files requested by a user of an electronic device. By prioritizing downloads in this manner, an application that currently has the user's focus may receive a relatively large amount of computing resources of the device, thus decreasing the amount of time that the user waits before this application receives its desired file(s).

For instance, a user may be operating a tablet computing device that is executing multiple local or web-based applications. These applications may include word-processing applications, email applications, games, spreadsheet applications, photo gallery applications, or the like. Further, each of these applications may need to obtain (e.g., download, stream, etc.) certain files, either as requested by the user simply as part of the default operation of the application. Acquiring these files, however, may require the use of certain resources of the device, such as disk I/O, memory, CPU resources, or the like.

As such, the devices described below may prioritize how to download these files in order to assist in maximizing the quality of an experience of the user operating the device. For instance, the devices may assign an application priority to each application that requests to obtain a file. In addition, the files may comprise multiple portions and elements, and the applications may assign an element priority to each respective element. When an application requests an file, the respective application may send a request to a centralized download manager responsible for receiving file requests and prioritizing the acquisition (e.g., downloading) of the file elements in response.

In response to receiving multiple requests from multiple applications, the download manager may determine an order in which to download the specific file elements according to both the respective application priorities of the requesting applications and the corresponding element priorities. For instance, the download manager may first identify the application having a highest application priority and may determine whether the file requested by any such applications includes one or more elements having a highest element priority. If so, then the download manager may obtain these highest-priority elements first. If the download manager determines that multiple applications having a highest application priority have at least one highest-element-priority element, then the download manager may download these elements first in a round-robin fashion, according to which element first made a request, or the like.

Thereafter, the download manager may determine whether any applications having a second-highest (or next-highest) application priority are requesting to download files that include one or more highest-element-priority elements. If so, then the download manager may obtain these elements next. The download manager may continue to obtain elements of the requested files in this manner until the device obtains each element of each requested file. By obtaining the elements in this manner, the device ensures that higher-priority applications are placed first in line for receiving resources of the device and, further, that the most essential elements of requested files are obtained first. It is to appreciated that downloading elements "first" may comprise downloading an entire element before downloading a subsequent element, requesting to download an element and then requesting to download a subsequent element before completion of the first element (or after a certain percentage has been downloaded), or the like.

Application priorities may be determined in multiple ways. In one example, an application that is currently in the foreground of a display of the device is associated with a highest priority. That is, because a user is likely currently most interested in this application given its place in the foreground of the display, assigning this application a highest priority may be of the most importance to the user. In addition, applications performing file-requests that have been initiated by a user of the device may be assigned a highest or relatively high priority, whereas applications simply requesting to cache certain items may be assigned a lesser priority. Furthermore, Applications requesting files that the corresponding applications have marked as "optional" files may also receive a lesser priority. In some instances, the download manager determines to wait to download cache files until the device resides in a certain state, such as being asleep or charging. Being "asleep" may comprise the device being in any low-power state, such as hibernated or simply a state in which the display of the device is off.

Elements of a requested file may be assigned priorities in a similar fashion in some instances. Further, in some instances the requesting applications, the download manager, a user, or any other entity may assign different file elements different priorities. In one example, an application requesting a file may assign elements a priority of "mandatory", "not mandatory", and "extra data" in descending order of importance.

As such, in response to receiving multiple file requests, the download manager may first download "mandatory" elements from a highest-priority application. Next, the download manager may download "mandatory" elements for a remainder of the requesting applications, in an order based on application priority. Thereafter, the download manager may download "non-mandatory" elements according to application priority, followed by "extra data" according to application priority. In other instances, meanwhile, the download manager may download an entire file for a highest-priority application first (according to element priorities), followed by a file requested by a next highest priority application, and so forth.

FIG. 1 illustrates select example components of the electronic device 100 that may be used to implement the techniques and functions described herein according to some implementations. Some common examples of the electronic device 100 may include digital media devices and eBook readers 100-1; tablet computing devices 100-2; desktop computing devices, terminals, and workstation computing devices 100-3; smart phones and mobile devices 100-4; laptop and netbook computing devices 100-5; televisions, gaming systems, and home and automotive electronic devices 100-6; and wearable electronic devices 100-1. For instance, the electronic device 100 may be a user-transportable device, a mobile device, or other portable device, such as a cellphone, a smart phone, a tablet computing device, an electronic book (eBook) reader device, a media player, a navigation device, a portable gaming device, a laptop computer, or other typically handheld devices that are easily passed between users. Additionally, in some examples herein, the electronic device 100 may be a wearable device or a device that is otherwise transported by a user, such as headphones, a helmet, augmented reality glasses, an article of clothing, a device retained in an armband or supported on a belt, a watch, a bracelet, an anklet, or any other portable or mobile electronic device having components capable of performing the recognition functions described herein, and that may be moved by, carried by, worn by, or supported by a person. Additionally, in some examples, herein, the electronic device may not be a handheld or user-transportable device, an instead may be a less mobile device such as a television, desktop computer, automotive electronic device, gaming console, appliance, tool and the like.

In a very basic configuration, the electronic device 100 includes, or accesses, components such as at least one control logic circuit, central processing unit, or processor 102 and one or more computer-readable media 104. Each processor 102 may itself comprise one or more processors or processing cores.

In addition, depending on the configuration of the electronic device 100, the computer-readable media 104 may be an example of tangible non-transitory computer-readable media and may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 100 may access external storage, such as RAID storage systems, storage arrays, network attached storage, storage area networks, cloud storage, or any other medium that can be used to store information and that can be accessed by the processor 102 directly or through another computing device or network. Accordingly, the computer-readable media 104 may be computer storage media able to store instructions, modules or components that may be executed by the processor 102.

The computer-readable media 104 may be used to store and maintain any number of functional components that are executable by the processor 102. In some implementations, these functional components comprise instructions or programs that are executable by the processor 102 and that, when executed, implement operational logic for performing the actions attributed above to the electronic device 100. Functional components of the electronic device 100 stored in the computer-readable media 104 may include a download manager 106, executable by the processor 102 as discussed herein.

Additional functional components stored in the computer-readable media 104 may include one or more applications 108 that function to request files as discussed above, an operating system 110 and a user interface module 112 for controlling and managing various functions of the electronic device 100 and providing basic functionality. Further, the electronic device 100 may include many other logical, programmatic and physical components, of which those described are merely examples that are related to the discussion herein.

FIG. 1 further illustrates a display 114, which may be passive, emissive or any other form of display, and may have a touch sensor associated therewith. The electronic device 100 may further include a touch sensor 116, as well as various types of other sensors 118, which may include an accelerometer, a gyroscope and other types of sensors. In addition, the electronic device 100 may include various other types of other input/output (I/O) components 120 such as various user controls (e.g., buttons, a joystick, a keyboard, a keypad, etc.), one or more speakers, a haptic or tactile output device, connection ports, and so forth. For example, the operating system 110 of the electronic device 100 may include suitable drivers configured to accept input from a keypad, keyboard, or other user controls and devices included as the I/O components 120. For instance, the user controls may include page turning buttons, navigational keys, a power on/off button, selection keys, and so on.

In some examples, the electronic device 100 may include at least one communication interface 122. The communication interface 122 may include one or more interfaces and hardware components for enabling communication with various other devices, such as other electronic devices 100 or other computing devices, such as directly or over a network. For example, the one or more communication interfaces 122 may support both wired and wireless connection to various networks, such as cellular networks, radio, WiFi networks, short-range or near-field networks (e.g., Bluetooth®), infrared signals, local area networks, wide area networks, the Internet, and so forth. Additionally, the electronic device 100 may include a power source, such as a battery and power control unit 124 for providing power to electronic device 100. Furthermore, the electronic device 100 may include various other components that are not shown, examples of which include removable storage, a PC Card component, and so forth, depending on the configuration and purpose of the electronic device 100.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 2:
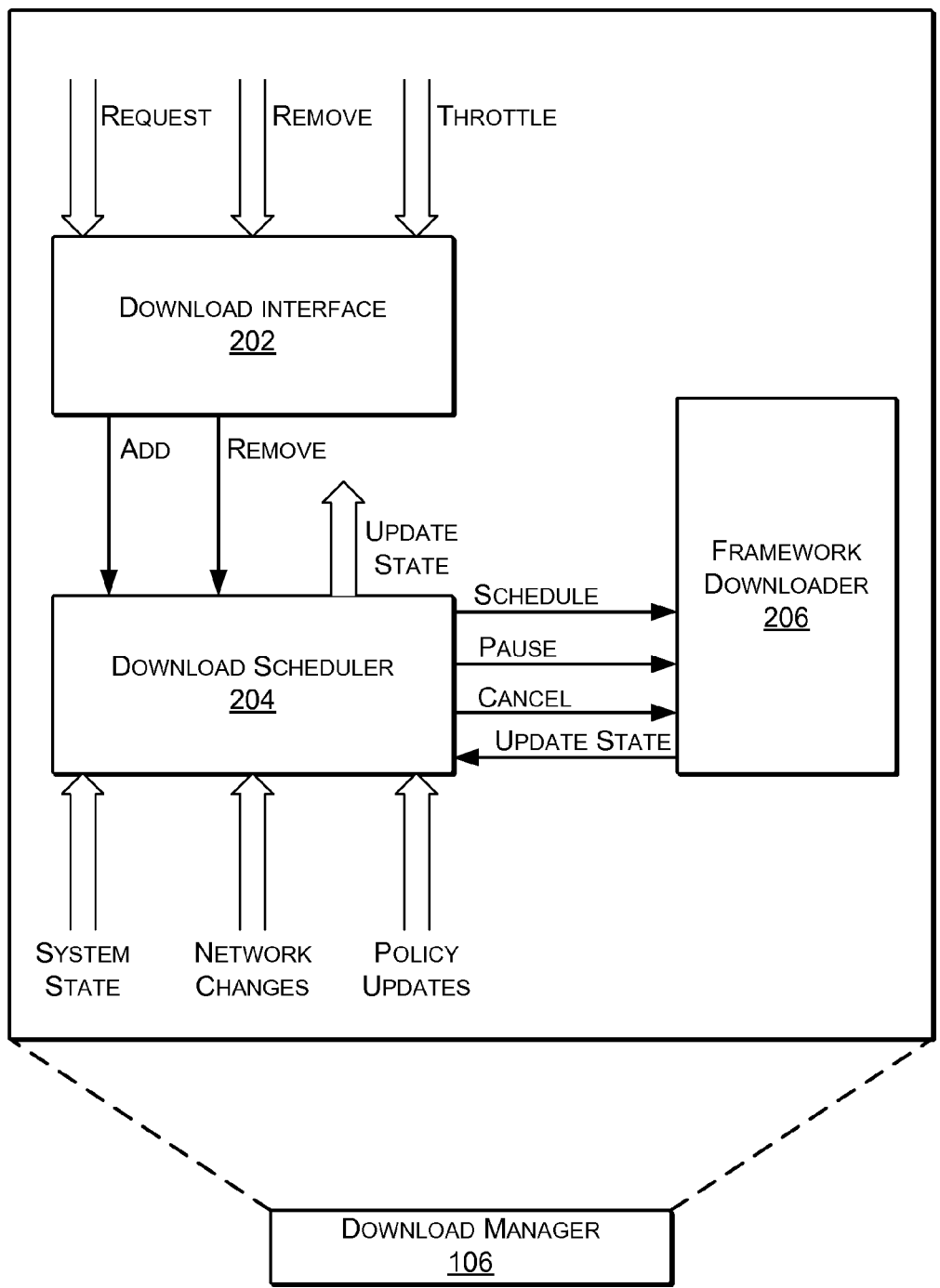
FIG. 2 illustrates example components of a download manager of the device of FIG. 1.

FIG. 2 illustrates example components of the download manager 106 of the device of FIG. 1. As illustrated, the download manager 106 may include a download interface 202, a download scheduler 204, and a framework downloader 206. The download interface 202 may be accessible to applications executing on the device 100. As such, when each of these applications receives a request from a user operating the device 100 necessitating the download of one or more files, the respective application may send a request through this interface 202. This request may comprise an indication of the type of requested file, metadata associated with the file (e.g., size, contents, etc.), where different portions or elements of the file are located, such as by submitting a sequence of uniform resource locators (URLs) pointing to the content of the file, and/or the like. Further, the different "portions" of a file may represent different types of data of the file (e.g., images, text, metadata, etc.), or may simply comprise different logical chunks of the file stored at different locations or broken up for compression purposes (e.g., as in the case of a ZIP file).

When an application sends a request to download a file, the application may assign different download priorities to these different portions or elements of the file. For instance, an application may assign a first download priority to a first set of elements and a second, lesser download priority to a second set of elements. In one example, an application may specify that a first set of elements of the file are mandatory for executing the file, while another set is optional, and yet another set is extra data or data to cache. In some instances, the applications may indicate that elements needed to serve the requested information to the user are "mandatory" elements, while the remaining elements are not. For instance, if the user requests to open a document, the application through which the user sends the request may designate those elements needed to display a first page of the information to the user as the "mandatory" elements. Of course, it is to be appreciated that the applications may assign any number and type of download priorities to portions of files.

In addition to using the interface 202 to send requests to download files, the applications may utilize the download interface 202 to remove these requests, as well as requests to toggle the downloading of these files and file portions. As illustrated, the interface 202 passes these received commands to the download scheduler 204, which creates a schedule or order in which to download elements of the file, possibly amongst elements of other files that other applications have also requested to download.

In some instances, the download schedule 204 may schedule an order in which to download elements of one or more files based on download priorities assigned to the applications that are making the requests, to the portions of the files as assigned by the applications or both. For instance, applications making a request may correspond to one of multiple different priorities. In one example, an application that is currently in a foreground of a display of the device may receive a highest application priority and, therefore, files requested by this application may be given the highest download priority (given that the user's attention is likely on this application). That is, an application whose contents are currently being displayed, and hence viewed by a user, may receive the highest download priority. In another example, an application making a request in response to a direct request from a user operating the application may have a priority that deemed "user-initiated". Meanwhile, requesting applications may be deemed "user optional" if the request does not initiate from a direct request from a user or "cache" if the request does not initiate from a direct request from a user and if the file is intended to be placed in cache. In these instances, a "user-initiated" request may be of a higher priority than a "user optional" request, which may be of a higher priority than a "cache" request.

Additionally or alternatively, the applications requesting a file may assign the priorities to the different portions or elements of the requested files. For instance, an application may designate a first set of elements of a file as "mandatory" while designating a second set of elements as "optional". As such, the former set of elements is associated with a higher priority than the latter set.

The download scheduler 204 may use these priorities to create a download schedule or order for downloading or otherwise obtaining (e.g., streaming) these files. The scheduler 204 may then provide this schedule to the framework downloader 206, which functions to obtain the file portions in the specified order. As illustrated, the scheduler 204 may also provide instructions to the downloader 206 to pause and/or cancel the downloader. Additionally, the downloader 206 may provide state updates back to the scheduler 204, which in turn may provide these state updates back to the interface 202 for surfacing to the requesting applications (e.g., to inform the applications that a certain percentage of the download is complete, etc.). While FIG. 2 illustrates a framework downloader 206 that downloads files on behalf of each requesting application, in some implementations the download manger 106 does not include this component. Instead, the download manager 106 determines the order or schedule and provides this to the application, which uses its own downloader to download the file in the specified order.

In either case, the download scheduler 204 may create the download schedule based on one or both of download priorities assigned to an application and download priorities assigned to file elements or portions. For instance, if multiple applications request to download respective files, the scheduler 204 may create a schedule that first downloads the file requested by the higher priority application. Additionally or alternatively, the scheduler 204 may create a schedule that indicates that each "mandatory" element is to be downloaded before any "optional" elements are downloaded. In these instances, the schedule may indicate that an element having a highest element download priority may be downloaded first, following by elements having the highest element download priority but associated with files from other applications, and so forth.

In addition to utilize the priority information described above when creating a download schedule, the download scheduler 204 may also take other factors into account, such as the state of the device, changes to the network to which the device couples, and the like. For instance, certain downloads may be performed at times when the availability of system resources are above a certain threshold, so as to avoid slowing down more important tasks of the device. To provide an example, applications issuing requests to cache information may be assigned a priority that results in the action being taken only when the device is asleep (e.g., the screen is off) and/or when the device is charging. In another example, certain downloads may only occur when the device is connected to a wireless network (e.g., a user's WAN) rather than to a cellular communication network (e.g., 3G, 4G, etc.).

In another example, if a device is executing a computationally intense application (e.g., a video, a game, etc.), then the download manager may cease downloads other than those requested by that particular application. For instance, if the I/O resource usage of the device is above a particular threshold, then the device may refrain from downloading other requested files until the I/O usages returns to less than the threshold.

Furthermore, in some instances the download manager 106 may change a priority associated with a requested file or a portion of the file. For instance, if a reading application requests that the device display an eBook requested by the user, the application may initially assign a highest priority to a certain set of elements (e.g., a table of contents, a first page, etc.). However, if the user requests to view chapter 10 while the device is downloading the book, the download manager 106 may dynamically change the priority of the content of chapter 10 to a highest priority such that the device begins downloading that content immediately. Similarly if a user moves an application from a background of the display to a foreground of the display, the download manager 106 may assign a new, higher priority to the application now in the foreground and/or may assign a lesser priority to the other application.

Finally, FIG. 2 illustrates that the policy of the download scheduler 204, potentially altering the assignment of priorities and the like.

Figure 3:
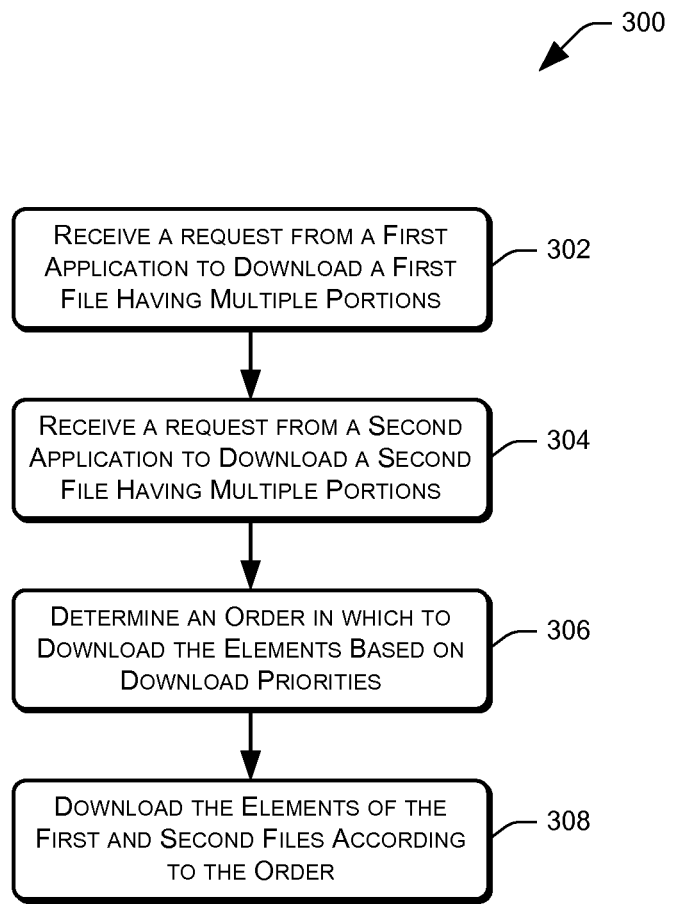
FIG. 3 is an example diagram of a process for determining an order in which to download multiple elements of multiple files based at least in part on download priorities.

FIG. 3 is an example diagram of a process 300 for determining an order in which to download multiple elements of multiple files based at least in part on download priorities. This process and other processes described herein may be implemented by the frameworks, architectures and devices described herein, or by other frameworks, architectures and devices. These processes are illustrated as a collection of blocks in logical flow graphs. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, some implementations might not implement each of the blocks.

At 302, the download manager 106 receives a request from a first application to download a first file having multiple portions. Each of these portions may be associated with a download priority, while the first application itself may also be associated with a download priority. At 304, the download manager 106 also receives a request from a second application to download a second file comprising multiple portions. The download manager 106 may receive this request before the download manager 106 has downloaded some or any of the first file. Further, each portion of the second file may also be associated with a download priority, as may the second application.

At 306, the download manager 106 determines an order in which to download the portions of the first and second files based at least in part on the download priorities, which may include the priorities of the individual portions of the files, of the applications, or both. Finally, at 308, the process 300 downloads the elements of the first and second file according to the determined order. Downloading elements in this manner may include requesting and obtaining the elements from the source(s) of the files, assembling the received elements, re-issuing requests for the files if the request fails, and/or the like.

Figure 4:
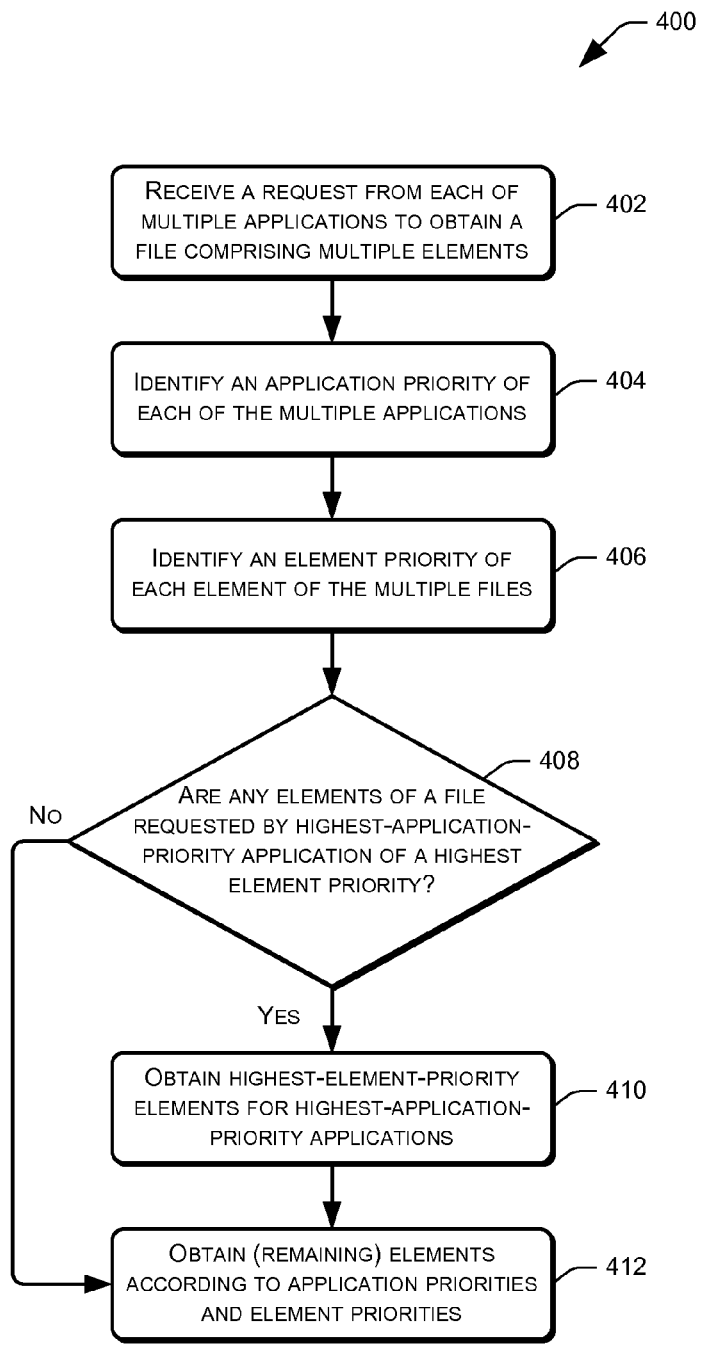
FIG. 4 is an example diagram of a process for determining an order in which to download multiple elements of multiple files based at least in part on priorities associated with the elements as well as priorities of applications requesting the files.

FIG. 4 shows an illustrative process 400 for prioritizing the acquisition of elements that make up files requested by applications executing on an electronic device.

At 402, the download manager 106 receives a request from multiple applications, with each application requesting that the download manager download, stream, or otherwise acquire a respective file. At 404, the download manager 106 identifies an application priority of each requesting application. At 406, the download manager 106 identifies a priority of each element of each requested file.

At 408, the download manager 106 determines whether any elements requested by a highest-application-priority application are of a highest element priority. If so, then at 410 the download manager 106 downloads each of these highest-element-priority elements, and may do so for each highest-application-priority application. If not, or after downloading these elements, the download manager obtains any remaining elements according to application priorities and element priorities at 412.

Figure 5:
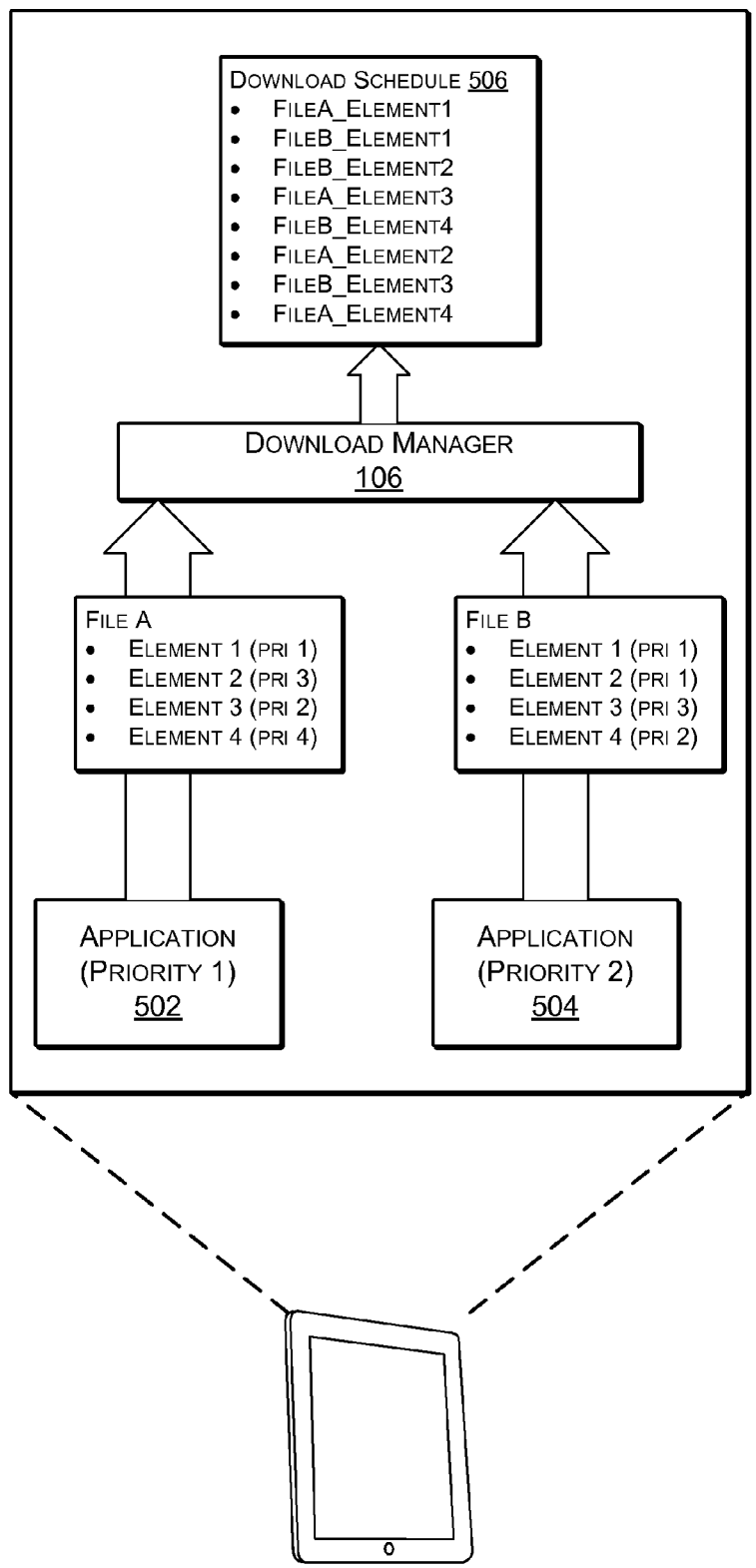
FIG. 5 illustrates an example order that the download manager described in FIG. 1 may determine based on application priorities and file-element priorities.

FIG. 5 illustrates an example of the download manager 106 receiving a request to download a first file ("File A") from a first application 502 as well as a second request to download a second file ("File B") from a second application 504. As illustrated, the application 502 has a highest application priority (priority 1), while the application 504 has a second highest application priority (priority 2). File A, meanwhile, includes a first element having a highest element priority (priority 1), a second element having a third-highest element priority (priority 3), a third element having a second-highest element priority (priority 2), and a fourth element having a fourth-highest element priority (priority 4). File B, meanwhile, includes a first element of priority 1, a second element of priority 1, a third element of priority 3, and a fourth element of priority 2.

In this example, the download manager 106 creates a schedule or order 506 in which to download the elements of Files A and B. As illustrated, the order 506 indicates that the highest-element-priority element of the file requested by the highest-application-priority priority is to be downloaded first, followed by the highest-element-priority elements of the file requested by the second-highest-application-priority application, and so forth. Specifically, the schedule 506 indicates that the elements of Files A and B are to be downloaded as follows:

Element 1 (element-priority 1) of File A (application-priority 1);

Element 1 (element-priority 1) of File B (application-priority 2);

Element 2 (element-priority 1) of File B (application-priority 2);

Element 3 (element-priority 2) of File A (application-priority 1);

Element 4 (element-priority 2) of File B (application-priority 2);
Element 2 (element-priority 3) of File A (application-priority 1);
Element 3 (element-priority 3) of File B (application-priority 2); and
Element A (element-priority 4) of File A (application-priority 1).

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computer-implemented method comprising:
   receiving, from a first application executing on an electronic device, a first request to obtain a first file, the first request specifying that a first element of the first file has a first download priority and specifying that a second element of the first file has a second-download priority that is less than the first download priority, wherein the first application is associated with a first window displayed by a display device of the electronic device;
   receiving, from a second application executing on the electronic device, a second request to obtain a second file, the second request specifying that a first element of the second file has the first download priority and a second element of the second file has the second download priority, wherein the second application is associated with a second window displayed by the display device;
   determining an order to request the first and second elements of the first file and the first and second elements of the second file based at least in part on respective download priorities, the order specifying to request the first element of the first file and the first element of the second file prior to requesting the second element of the first file and the second element of the second file;
   requesting the first and second elements of the first file and the first and second elements of the second file according to the order;
   receiving at least one of the first element of the first file, the second element of the first file, the first element of the second file, or the second element of the second file;
   changing an execution priority of the second application from a background priority to a foreground priority;
   modifying the order; and
   receiving a remainder of the first element of the first file, the second element of the first file, the first element of the second file, or the second element of the second file.

2. A computer-implemented method as recited in claim 1, further comprising:
   determining that contents of the first application are currently being displayed; and wherein the determining of the order comprises determining to request the first element of the first file prior to the first element of the second file based at least in part on determining that the contents of the first application are currently being displayed.

3. A computer-implemented method as recited in claim 1, wherein the first application specifies which elements of the first file have the first download priority and which elements have the second download priority, and the second application specifies which elements of the second file have the first download priority and which elements have the second download priority.

4. A computer-implemented method as recited in claim 1, wherein an element priority of an individual element of a particular file is based at least in part on whether the individual element of the particular file has been marked as mandatory or optional.

5. One or more non-transitory computer-readable media storing computer-executable instructions that, when executed by one or more processors of a device, cause the one or more processors to perform acts comprising:
   receiving, from a first application, a first request to obtain a first file, the first request specifying that a first element of the first file has a first download priority and specifying that a second element of the first file has a second download priority that is less than the first download priority, wherein the first application is associated with a first window displayed by a display of the device;
   receiving, from a second application, a second request to obtain a second file, the second request specifying that a first element of the second file has the first download priority and a second element of the second file has the second download priority, wherein the second application is associated with a second window displayed by the display of the device;
   determining a schedule indicating an order in which to request the first and second elements of the first file and the first and second elements of the second file based at least in part on respective download priorities, the order specifying to request the first element of the first file and the first element of the second file prior to requesting the second element of the first file and the second element of the second file;
   requesting the first and second elements of the first file and the first and second elements of the second file according to the order;
   receiving at least one of the first element of the first file, the second element of the first file, the first element of the second file, or the second element of the second file;
   changing an execution priority of the second application from a background priority to a foreground priority;
   modifying the order; and
   receiving a remainder of the first element of the first file, the second element of the first file, the first element of the second file, or the second element of the second file.

6. One or more non-transitory computer-readable media as recited in claim 5, wherein the order indicates that elements having a highest element priority and associated with a file requested by an application having a highest application priority are to be requested first.

7. One or more non-transitory computer-readable media as recited in claim 5, wherein the order indicates that:
   elements: (i) having a highest element priority, and (ii) associated with a file requested by an application having a highest application priority are to be requested first; and
   elements: (i) having a highest element priority, and (ii) associated with a file requested by an application having a second-highest application priority are to be requested second.

8. One or more non-transitory computer-readable media as recited in claim 5, wherein an application priority is based at least in part on determining that contents of an associated application are being displayed in a foreground on the device.

9. One or more non-transitory computer-readable media as recited in claim 5, wherein an application priority is based at least in part on one or more of: a request for a file being initiated by a user of the device, a request for the file comprising a request to cache the file, or an application requesting the file having deemed the file optional.

10. One or more non-transitory computer-readable media as recited in claim 5, wherein an element priority of an individual element of a particular file is based at least in part on whether the individual element of the particular file has been marked as mandatory or optional.

11. One or more non-transitory computer-readable media as recited in claim 5, the acts further comprising determining to request one or more files or elements when the device is in a predefined state based at least in part on a corresponding application priority or a corresponding element priority.

12. One or more non-transitory computer-readable media as recited in claim 5, the acts further comprising determining to request one or more files or elements according to the order when the device is asleep or charging based at least in part on a corresponding application priority or a corresponding element priority.

13. A computing device comprising:
one or more processors; and
one or more non-transitory computer-readable media storing computer-executable instructions that, when executed by the one or more processors, cause the one or more processors to perform acts comprising:
receiving, from a first application, a first request to obtain a first file, the first request specifying that a first element of the first file has a first download priority and specifying that a second element of the first file has a second download priority that is less than the first download priority, wherein the first application is associated with a first window displayed by a display device of the computing device;
receiving, from a second application, a second request to obtain a second file, the second request specifying that a first element of the second file has the first download priority and a second element of the second file has the second download priority, wherein the second application is associated with a second window displayed by the display device;
determining an order to request the first and second elements of the first file and the first and second elements of the second file based at least in part on respective download priorities, the order specifying to request the first element of the first file and the first element of the second file prior to requesting the second element of the first file and the second element of the second file;
requesting the first and second elements of the first file and the first and second elements of the second file according to the order;
receiving at least one of the first element of the first file, the second element of the first file, the first element of the second file, or the second element of the second file;
changing an execution priority of the second application from a background priority to a foreground priority;
modifying the order; and
receiving a remainder of the first element of the first file, the second element of the first file, the first element of the second file, or the second element of the second file.

14. A computing device as recited in claim 13, wherein an application whose contents are currently being displayed has a highest application priority.

15. A computing device as recited in claim 13, wherein elements that are mandatory for performing a current function requested by an application have a highest element priority.

16. A computing device as recited in claim 13, wherein the requesting comprises requesting to download or requesting to stream elements of the first file or the second file.

17. An apparatus comprising:
one or more processors;
a memory;
a download manager, stored in the memory and executable by the one or more processors to perform operations comprising:
displaying a first window associated with a first application that is being executed by the one or more processors;
receiving, from the first application, a first request to obtain a first file comprising at least a first portion and a second portion;
receiving, from the first application, a first priority message assigning a first download priority to the first portion and assigning a second download priority to the second portion;
displaying a second window associated with a second application that is being executed by the one or more processors;
receiving, from the second application, a second request to obtain a second file comprising at least a third portion and a fourth portion;
receiving, from the second application, a second priority message assigning a third download priority to the third portion and a fourth download priority to the fourth portion;
determining a download order for sending requests to obtain at least one or more portions of the first file or one or more portions of the second file, wherein the first download priority and the third download priority indicate a mandatory download, and wherein the second download priority and the fourth download priority indicate a non-mandatory download;
sending a first request to obtain a highest priority portion according to the download order;
receiving a user selection selecting the second window;
changing a priority of the second application from a background priority to a foreground priority;
modifying the download order to create a modified download order; and
sending a second request to obtain a second highest priority portion according to the modified download order.

18. An apparatus as recited in claim 17, wherein the download manager includes a download interface configured to receive download requests from applications stored in the memory, and wherein the first and second applications send the request for the first file and the request for the second file, respectively, to the download manager via the download interface.

19. An apparatus as recited in claim 17, wherein:
determining the download order comprises determining an order in which to request the first portion, the second portion, the third portion, and the fourth portion based at least in part on the first download priority, the second download priority, the third download priority, and the fourth download priority.

20. An apparatus as recited in claim 17, wherein the operations further comprise:
determining that a screen of a display device associated with the apparatus is off; and
sending a third request to obtain one or more portions indicated as being non-mandatory downloads.

\* \* \* \* \*